Patented May 3, 1932

1,856,938

UNITED STATES PATENT OFFICE

EDWIN O. WIIG, OF MADISON, WISCONSIN, ASSIGNOR TO THE WISCONSIN ALUMNI RESEARCH FOUNDATION, OF MADISON, WISCONSIN, A CORPORATION OF WISCONSIN

METHOD AND MEANS FOR LEAVENING

No Drawing.     Application filed May 10, 1928. Serial No. 276,809.

The present invention relates generally to leavening agents and to the method of using them, such for example, as may be employed in the composition of baking powders. The invention has particular reference to the decomposition of certain types of organic compounds under conditions making them suitable for leavening purposes, such as baking.

The object of the invention therefore, is to provide a leavening agent essentially organic in nature which is subject to decomposition to form a leavening gas.

Another object of the invention is to provide a harmless substance having harmless effects when edible products are leavened therewith.

A particular object of the invention is the use of a ketonic carboxylic acid, such for example, as acetone dicarboxylic acid, as a leavening agent.

A further object of the invention is the provision of a leavening agent having the property of decomposition into a material which has a boiling point within the range of the leavening process.

Acetone dicarboxylic acid, a water soluble compound, is taken as an example of the substance herein contemplated in order to explain the nature and character and the various advantages of the invention.

In the first instance this material has been found to be very successful in leavening pastry, such as cakes, etc., and to be without deleterious effects.

Secondly, it can be readily prepared by known processes from citric acid as a base, and citric acid is at present available in large quantities at a reasonable price.

Thirdly, it is an advantageous substance because it yields no mineral products when used as a free acid, and it therefore has a higher efficiency, weight for weight, when compared with mineral powders.

Fourthly, it is the simplest member of the symmetrical ketone dicarboxylic acid series, and is sufficiently unstable to suit ordinary baking conditions in a manner comparable to other baking powders.

Fifthly, it is sufficiently stable so that its deterioration is negligible and substantially not different from other baking powders.

Various other objects and advantages of the invention will be apparent from the following description and discussion of the exemplary compound as used in baking, and of the general properties of the class of substances which is thus exemplified as a leavening agent.

In using the term "leavening" I do not confine myself to action on foodstuffs, but wish to be considered as referring to other similar operations where gas evolution in a mass produces a cellular structure, such for example, as might be produced during the heating and vulcanizing of rubber to produce porous or sponge rubber. The leavening of edibles such as cakes, has, however, particular requirements and limitations which make this art particularly difficult to satisfy.

For various reasons, some of which have been above stated, I find that acetone dicarboxylic acid may be satisfactorily employed as a leavening agent for pastry, etc. The literature states that this acid, as such, is very unstable decomposing in a few hours at room temperature, but I have found that this acid when properly prepared and purified is very stable, and can be kept for many months with little decomposition. I have also found that its decomposition is brought about by the action of heat and that within the ordinary range of baking temperatures its decomposition can be effected in such a manner that it forms an excellent baking powder base. I have also found that the presence of some alkali acts as a catalyst for the decomposition, and I aim to employ this principle in varying the particular properties of the baking powder at will.

When used in foodstuffs this acid breaks down under the cooking heat into carbon dioxide and acetone, both of which products are gaseous at baking temperatures. The gaseous volume is ⅔ carbon dioxide and ⅓ acetone vapor, and there is no residue or mineral matter left behind. I have tested the baked products and found only the slightest trace of acetone therein, a quantity far less than what has been considered non-injurious to the human system.

Because of the high gassing efficiency of this material I find it desirable to employ it with a diluent in order that the resulting mixture will approximate the standard baking powders, and I use sufficient diluent so that ordinary baking receipts specifying "baking powder" by volumes may be employed without regard to the greater efficiency of baking powder base.

As a diluent I use preferably a starch product, such as flour, corn starch, rice starch, etc., in the proportion of one part of acid to three parts of starch. Such a composition is light and fluffy compared to the mineral baking powders, and a given weight of the mixture, such as a one pound can, contains many more spoonfuls than the numerous well known baking powders.

The composition in the proportions above stated gives about 15% carbon dioxide, and about 10% acetone. Certain legal requirements for baking powders specify not under 12% available carbon dioxide. Accordingly, I use a 15% carbon dioxide mixture to allow for a certain degree of deterioration on the shelf. Nevertheless, since the acetone vapor performs the same leavening function as the carbon dioxide, the composition could readily be changed to provide only an 8% carbon dioxide content without falling below the prescribed efficiency limit for standard powders. This will readily be appreciated upon considering that the acetone vapor is present in volume equal to 50% of the volume of carbon dioxide. Accordingly, an 8% carbon dioxide-producing mixture of the present invention would act in all respects like a 12% carbon dioxide baking powder.

The stability of the product is dependent upon several factors, such as heat, moisture, and the presence of alkali, and particularly the combination of alkali and water. Hence I aim to keep the product far from this last combination. Moisture alone is not nearly as harmful in the absence of alkaline substance. In making mixtures with starch it has been desirable to reduce the normal 10% or so water-content to a lower value. I therefore prefer to dry the starch, as for example, by subjecting it to the vacuum produced by a water suction pump and to the heat of the steam bath for several hours. A mixture of starch so dried and of the acetone dicarboxylic acid has been kept at room temperature of about 75° F. for several months with indications of decomposition which amounts to a change from a 15% carbon dioxide to 13% carbon dioxide content by the end of the year. Such a mixture is therefore relatively stable and suitable for merchandising.

Ordinary baking powders when mixed with liquid or moist ingredients of dough or batter liberate a little gas before heat is applied. The free acid of the present invention is not so prone to act in this way in the absence of alkali in the batter or other mixture, and I aim therefore to add alkali at this point, such as sodium bicarbonate, the acid sodium phosphates or the ammonium carbonates. The catalytic effect of this alkali hastens the decomposition of the acid, and the time and extent of decomposition may thus be controlled by regulation of the alkalinity.

The alkali may be incorporated initially into the acid-diluent mixture, which when sufficiently dry will not be readily decomposed by the alkali. Materials which hydrolyze to form the hydroxyl ion may be incorporated, and as an example of such a compound a metal salt of the free acid may be employed. A few of the salts of this acid are known, such for example, as the barium salt, which is said to be stable at 0° C., subject to decomposition with heat or with water. Any salt having a physiologically harmless metal, such as sodium, potassium, lithium, magnesium, etc., and which is stable under the conditions of normal storage of baking powders may therefore be incorporated into the mixture to provide the alkali, or it may be present as the entire supply of the acid employed.

Another feature of the baking powder is the evolution of two gases, one of which has a liquid phase with a boiling or transition point above the normal mixing temperatures and below the baking temperatures. Acetone dicarboxylic acid evolves acetone which has a boiling point of about 56.5° C. (133° F.). Accordingly there can be created a rather sharp increase of gas formation in the region of this temperature. Although this effect has not yet proven particularly advantageous in the baking of pastries it can be used in other leavening processes and the critical point chosen or regulated by choosing an initial material which gives a product comparable to acetone but of different boiling point. Another way of regulating the transition point without employing another substance is to regulate the pressure during the process. For example, in the vulcanization of rubber as above suggested for the production of sponge rubber, pressure may be applied to increase the temperature at which acetone as a liquid is converted into acetone as a vapor.

The vulcanization of rubber takes place at temperatures higher than pastry baking temperatures, and when it is desirable to evolve the leavening gas at a higher temperature a more stable leavening agent having the essential characteristics of acetone dicarboxylic acid may be employed. It is a matter of general knowledge in chemistry that the farther apart two carboxylic acid groups in a molecule are separated, as by the introduction of —$CH_2$— groups, the more stable is the molecule and a product having the formula

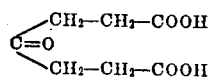

decomposing like the acetone dicarboxylic acid of this invention would be expectedly more stable and would form diethyl ketone or propione (boiling point 103° C.) rather than dimethyl ketone or acetone (boiling 56.5° C.).

In regard to leavening processes other than pastry cooking, the use of a non-mineral leavening agent may be particularly advantageous in eliminating catalytic or side reactions, or the final presence of mineral in the product.

My invention therefore is to be considered broadly as the use in leavening processes of more or less unstable organic compounds having the essential characteristics of acetone dicarboxylic acid, and particularly as the provision of the latter as a baking powder base, with all such permissible variations and modifications as fall within the scope of the appended claims.

I claim:

1. The process of leavening which comprises incorporating, as a leavening agent into a mass to be leavened, a ketone dicarboxylic acid which decomposes with heat, and heating the mass to effect decomposition of said agent.

2. A process of leavening which comprises incorporating as a leavening agent, into a mass to be leavened, a ketone dicarboxylic acid which decomposes with heat, and an alkaline substance capable of aiding decomposition of said agent, and heating the mass to bring about said decomposition.

3. A process of leavening foodstuffs which comprises incorporating into a mixture to be leavened acetone dicarboxylic acid, and subjecting the mixture to heat.

4. A process of leavening food stuffs which comprises incorporating into a mixture to be leavened acetone dicarboxylic acid and a substance capable of rendering the mixture alkaline to aid in decomposition of said acid.

5. A process of leavening food stuffs which comprises incorporating into a mixture to be leavened acetone dicarboxylic acid and a substance capable of rendering the mixture alkaline to aid in decomposition of said acid, and subsequently subjecting the mixture to heat.

6. The process of leavening which comprises incorporating into a mass to be leavened by evolution of gas and the application of heat as a leavening agent a ketone dicarboxylic acid which is capable of decomposition on the application of heat into a leavening gas and into a leavening product capable of passing from a liquid to a vapor phase in the leavening process, and heating the mixture from a temperature below the transition temperature for such product to a temperature above said transition temperature.

7. The process of leavening which comprises incorporating into a mass to be leavened by the application of heat, as a leavening agent a ketone dicarboxylic acid which is capable of decomposition within the mass forming a product having the capacity of passing from a liquid to a vapor phase, and heating the mixture from a temperature below the transition temperature for such product to a temperature above said transition temperature.

8. A leavening agent containing acetone dicarboxylic acid and a diluent.

9. A baking powder containing acetone dicarboxylic acid and starch as a diluent.

10. A baking powder containing acetone dicarboxylic acid and dried starch as a diluent.

11. A baking powder containing acetone dicarboxylic acid and a dry powdered diluent.

In testimony whereof, I have subscribed my name.

EDWIN O. WIIG.